UNITED STATES PATENT OFFICE.

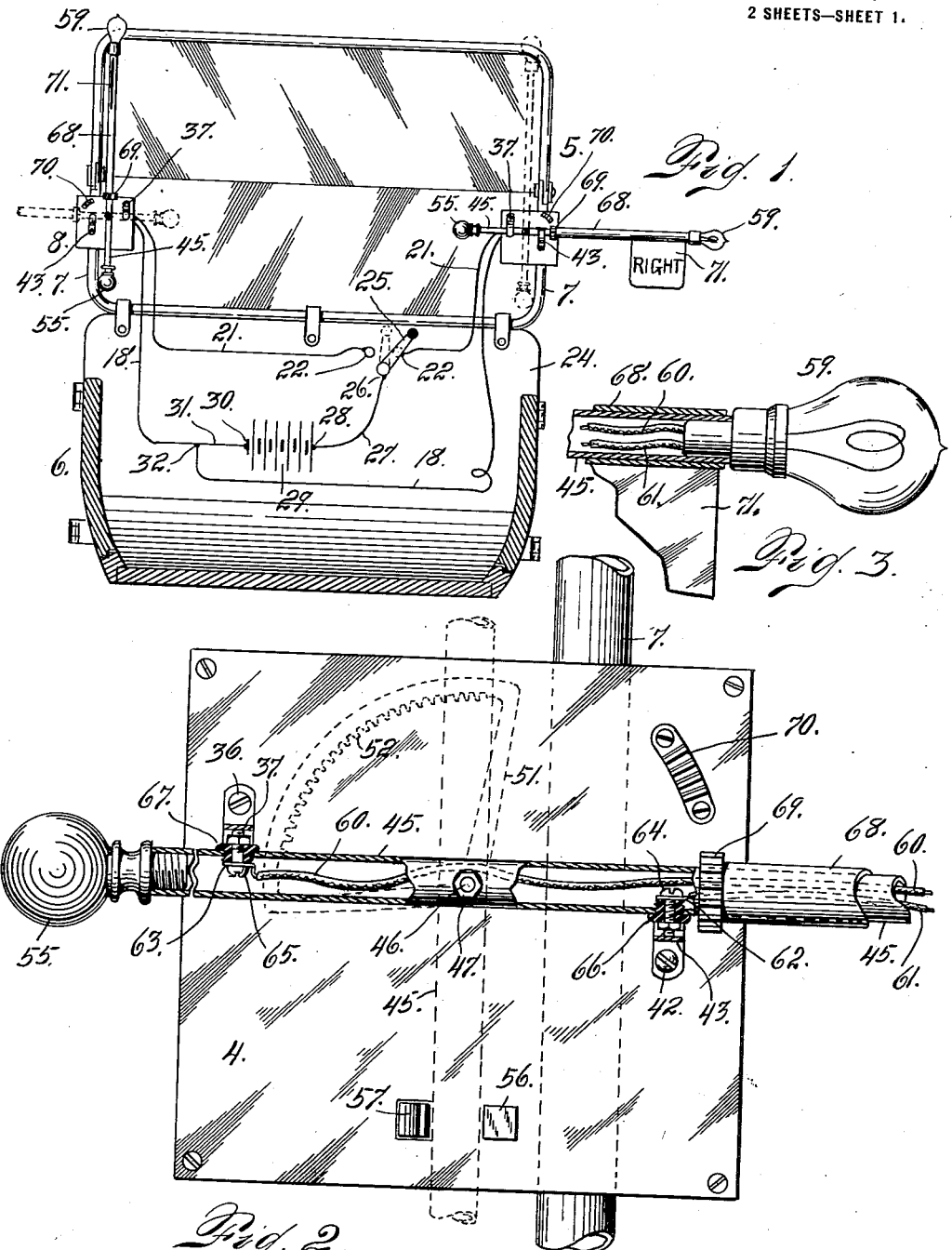

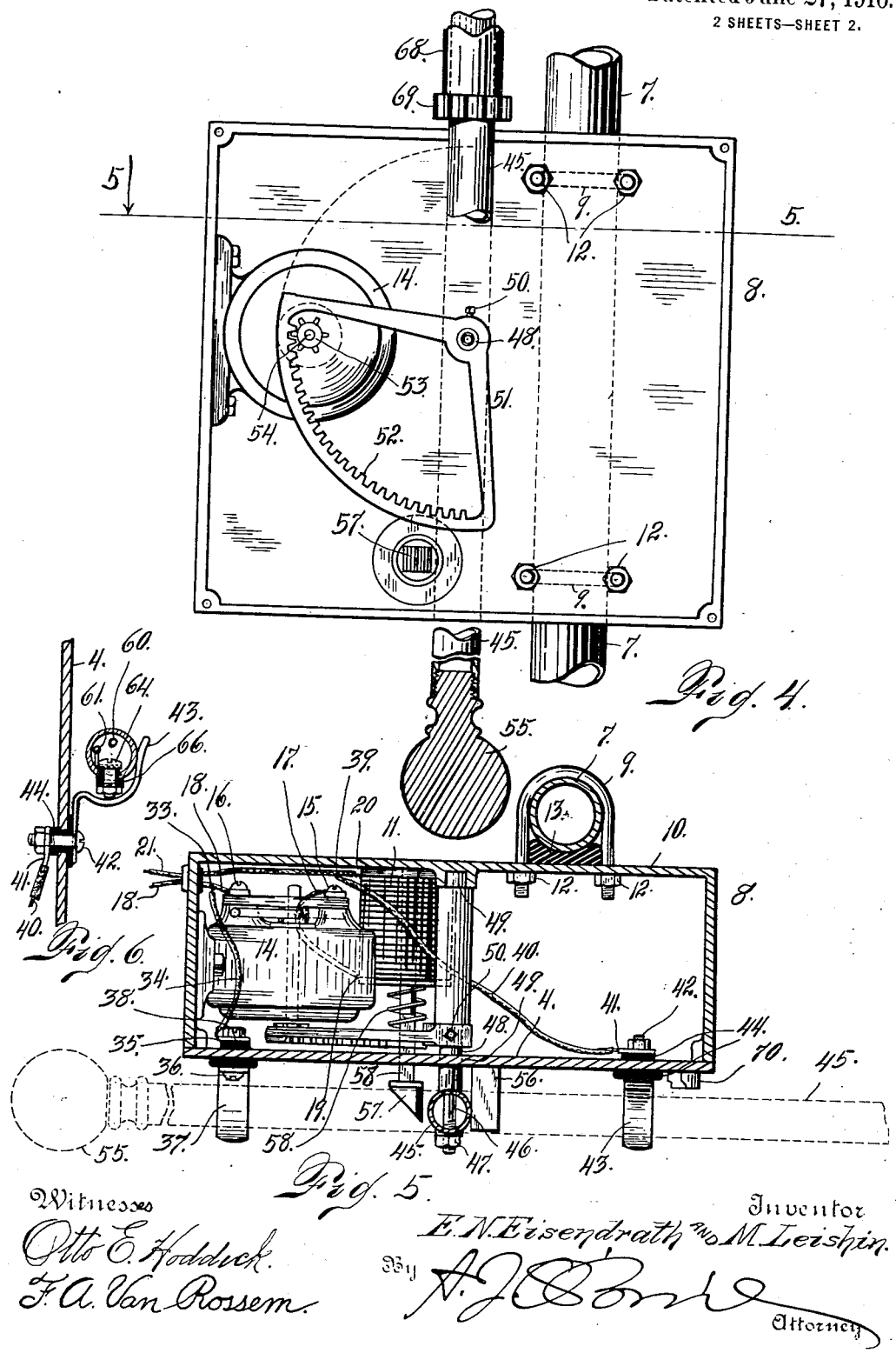

EDWIN N. EISENDRATH AND MAX LEISHIN, OF DENVER, COLORADO.

AUTOMOBILE-SIGNAL.

1,189,076.  Specification of Letters Patent.  Patented June 27, 1916.

Application filed July 20, 1915. Serial No. 40,933.

*To all whom it may concern:*

Be it known that we, EDWIN N. EISENDRATH and MAX LEISHIN, citizens of the United States, residing at the city and county of Denver and State of Colorado, have invented certain new and useful Improvements in Automobile-Signals; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in automobile signals, or signals adapted to be attached to automobiles or other motor vehicles, or vehicles of any kind requiring signals, in order to indicate to the drivers of other machines either following or approaching, and to pedestrians and others that the driver of the machine in question is about to turn in one direction or the other.

Our object is to provide a device of this character which shall be simple in construction, comparatively economical in cost, reliable, durable and generally efficient in use and to these ends the invention consists of the features, arrangements and combinations hereinafter described and claimed all of which will be fully understood by reference to the accompanying drawing in which is illustrated an embodiment thereof.

In this drawing, Figure 1 is a section taken through the body of the machine in the rear of the wind shield, but looking forwardly, the machine being equipped with our improved signals, one of which is shown in the danger or signaling position in full line, while the corresponding position of the other signal is indicated by dotted lines. Fig. 2 is a detail elevation shown on a larger scale illustrating the device, with parts broken away. Fig. 3 illustrates partly in section, the outer portion of the signaling arm, being the portion which is broken away from the arm as shown in Fig. 2. Fig. 4 is a view similar to Fig. 1, but with the face plate of the casing removed, and the signaling arm shown in a different position, being in the upright or normal position. Fig. 5 is a horizontal section taken on the line 5—5, Fig. 4 looking downwardly. Fig. 6 is a fragmentary sectional view of the structure, the section being taken on the line 6—6, Fig. 5 looking toward the right.

The same reference characters indicate the same parts in all the views.

Let the numeral 5 designate the wind shield of an automobile whose body portion may be designated by the numeral 6. Mounted on each of the upright bars 7 of the wind shield is a casing 8, the casing in each instance being secured to its corresponding bar by means of a pair of U-clips 9, whose closed ends engage the bar and whose threaded extremities are passed through perforations formed in the front wall 10 of the casing, nuts 12 being applied to the threaded extremities of these clips to secure them tightly in place. In order to prevent possible rattling of the casing, due to the vibration of the machine, a cushion 13 is located between the arm 7 and the adjacent surface of the casing wall or plate 10. Within this casing is located an electric motor 14 whose poles 15 and 16 are respectively connected with conductors 17 and 18. The conductor 17 leads from the pole 15 of the motor to a terminal 19 of an electro-magnet of the solenoid type. From the opposite terminal 20 of the magnet or the coils thereof, a conductor 21 leads to a contact 22. There are two of these contacts 22 and two conductors 21 since there are two signaling devices one on each side of the wind shield. For this reason a description of one signal device will be sufficient as both devices are substantially identical.

Arranged to coöperate with the two stationary contacts 22, is a switch arm 25 which is pivotally mounted on the dash board as shown at 26. From the pivoted extremity of this switch arm leads a conductor 27 to a pole 28 of a source of electricity 29 carried by the car being preferably in the form of a battery. From the opposite pole 30 of this source, leads a conductor 31, which may be said for convenience to terminate at a point 32. From this point 32 lead two conductors 18 each of which passes through an opening in the casing 8 and is connected with the pole 16 of the motor as heretofore explained.

From each conductor 18 at a point 33 within the casing leads a conductor 34 to a contact 35 which is electrically connected by means of a screw 36 with a stop 37 mounted on the rear wall 38 of the casing, the contact as well as the stop being insulated from the casing as shown at 38. From the conductor 21 at a point 39 just beyond the terminal 21 of the magnet, leads a conductor 40 to a contact 41 mounted on the rear wall of the casing and connected by means of a bolt or screw 42 with a stop 43, the two parts 41 and 43 being insulated from the casing as shown at 44. It will thus be seen that the two stops 37 and 43 are respectively connected electrically with the poles 28 and 30 of the battery or source of current 29.

A signal arm 45 is connected by means of a threaded shank 46 and a nut 47 with a shaft 48 extending at right angles and journaled as shown at 49 within the casing. Secured to this shaft by means of a set bolt or other suitable fastening device 50 is a segmental gear 51 having an internal rack 52 adapted to engage in meshing relation with a pinion 53 fast on the armature shaft 54 of the motor 15, whereby as the motor is operated, the signal arm is actuated through the medium of the said pinion and gear.

The signal arm is normally caused to assume the upright position, by means of a weight 55 applied to its lower extremity, this weight being of such mass, that when the current is cut off from the motor, the weight will suffice to throw the arm from the horizontal position, (see Figs. 1 and 2), to the upright position (see Fig. 4). When in the upright position the portion of the signal arm below its axis or its connection with the shaft 48, is in engagement with a stop or abutment 56 on one side, while the beveled extremity 57 of the core or plunger 58 of the magnet 11 engages it or occupies a position close to it on the opposite side. When it is desired to operate the signal arm in order to cause it to assume the horizontal position for signaling purposes, the motor is operated the magnet 11 being simultaneously energized whereby the plunger 58 is withdrawn from the path of the signal arm, whereby the latter is allowed to assume the horizontal position. As soon as the magnet is deënergized a spiral spring 58 returns the plunger 58 to its position for retaining the signal arm in its normal or vertical position.

When the signal arm is in the horizontal position, it engages the two stops 37 and 43 the former from below and the latter from above. An incandescent lamp 59 is carried by the signaling extremity of this arm and its conductors 60 and 61 are respectively connected as shown at 62 and 63 (see Fig. 2) with contact screws 64 and 65 which are mounted on the signaling arm 8 and insulated therefrom as shown at 66 and 67. The contact screws 64 and 65 are so arranged that when the signal arm is in the horizontal position (see Fig. 2), these screws respectively engage the stops 43 and 37, whereby the electrical circuit is closed through the lamp thus lighting the latter for the purpose of giving increased efficiency to the signal in the night. The outer portion of the signaling arm near the lamp, is equipped with a flag 68 preferably composed of metal and having the word right or left thereon according to the position of the signal upon the automobile, that is to say whether it is on the right or left hand side thereof.

As the signal arm moves to the horizontal position, it engages the beveled surface of the extremity 57 of the plunger 58, whereby the plunger is temporarily forced inwardly until the signal arm has assumed the upright position after which the spring 19 returns the beveled extremity of the plunger to its position adjacent the signal arm and on the opposite side thereof from the stationary stop or abutment 56.

From the foregoing description the use and operation of our improved automobile signal will be readily understood. Normally both signal arms 8 are in the upright position as indicated by dotted lines at the right and by full lines at the left in Fig. 1. Furthermore the switch arm is normally in the dotted line position (see Fig. 1) or located intermediate the two stationary contacts 22. If it is desired to operate either signal, the switch arm is moved into engagement with the right or left contact 22 depending on whether the right or left hand signal is to be operated to indicate a corresponding turn of the machine. For instance assuming that it is desired to operate the right hand signal to indicate that the driver of the machine is about to make a right hand turn, the switch arm 25 will be moved into engagement with the right hand contact 22, being its full line position in Fig. 1. This will close the circuit through the motor 14, which will then be operated to move the gear 51 from the position shown in Fig. 4, to the position shown in Fig. 2. This movement of the gear will throw the signal arm to the horizontal position (see Figs. 1 and 2), whereby the contact screws 64 and 65 will be brought respectively into engagement with the stops 43 and 37. By virtue of the engagement of the contact screws or stops as aforesaid, the circuit will be closed through the lamp 59. Hence the lamp will be lighted at the same time the signal arm is caused to assume the horizontal or signaling position.

When the signal arm is in the upright position, its flag 68 is extended in the direction of the travel of the machine. This flag is mounted on a rotary sleeve 69 carried by the signal arm. This sleeve also has a gear 70 which is adapted to engage a relatively short cogged rack 71, as the arm moves from the vertical to the horizontal position or vice versa. Hence as the arm moves from the vertical to the horizontal position, the gear or pinion 69 will engage the gear 70, whereby the sleeve 68 will be moved sufficiently to throw the flag outwardly or cause its flat surface to be presented to the view from both the front and rear of the machine. Again as the signal arm moves from the horizontal to the vertical position, the gear 69 will again engage the gear 70, and reverse the movement of the sleeve 68 whereby the flag is turned to its normal position or that in which its edge is presented to the view from front or rear.

Attention is called to the fact that by reason of the vibration of the machine, the signal arm will be constantly in motion when in the horizontal or signaling position, which movement of the signal arm increases the efficiency of the signal since the lamp circuit will be alternately made and broken resulting in the producing of a blinking light, thus making the signal much more conspicuous than otherwise would be the case. It must be understood that the casing or box 8 may be mounted or supported in any suitable manner.

It should also be stated that our improved signal may be employed in all relations where a signal may be needed whether on an automobile or other vehicle or mounted upon a stationary object since the invention resides in the construction of the device and not upon the use to which it is put.

Having thus described our invention what we claim is,—

1. In an automobile signal, the combination of a support, a motor, a circuit in which the motor is located, a signal arm, an operative connection between the said arm and the motor, the signal arm being counterbalanced to assume the upright position, and means for maintaining the said arm in such position, said means comprising a stationary member, and a movable member arranged in opposing relation.

2. In an automobile signal, the combination of a support, a motor, a circuit in which the motor is located, a signal arm, an operative connection between the said arm and the motor, the signal arm being counterbalanced to assume the upright position, and means for maintaining the said arm in such position, said means comprising a stationary member, and a movable member arranged in opposing relation, the movable member being spring actuated in one direction.

3. In an automobile signal, the combination of a support, a motor, a circuit in which the motor is located, a signal arm, an operative connection between the said arm and the motor, the signal arm being counterbalanced to assume the upright position, and means for maintaining the said arm in such position, said means comprising a stationary member, and a movable member arranged in opposing relation, the movable member being spring actuated in one direction, and electro-magnetic means for moving the last named arm in the opposite direction, said means being located in the motor circuit.

4. In an automobile signal, the combination with a support, of a signal arm counterbalanced to assume the upright position, an electric motor connected in operative relation with the arm to throw the latter to the horizontal or signaling position, a circuit in which the motor is located, an electric lamp carried by the signaling arm, contacts arranged to engage the signaling arm both above and below when the said arm is in the horizontal position, and a circuit in which said contacts and the lamp of the signal arm are located, the said circuit being shunted from the motor circuit.

In testimony whereof we affix our signatures in presence of two witnesses.

EDWIN N. EISENDRATH.
MAX LEISHIN.

Witnesses:
A. J. O'BRIEN,
A. EBERT O'BRIEN.